United States Patent Office 3,577,519
Patented May 4, 1971

3,577,519
PROCESS FOR CONTROLLING THE AMOUNT OF DENSIFICATION IN POLYURETHANE FOAMS AND PRODUCTS PRODUCED THEREBY
Mario A. Gambardella, Milford, Conn., assignor to Olin Mathieson Chemical Corporation
No Drawing. Continuation-in-part of abandoned applications Ser. No. 658,314, Aug. 4, 1967, and Ser. No. 715,116, Feb. 27, 1968. This application Nov. 29, 1968, Ser. No. 780,246
Int. Cl. C08g 22/44; B29d 27/00
U.S. Cl. 264—54
8 Claims

ABSTRACT OF THE DISCLOSURE

The exterior, less dense layers in a selected, flexible densified polyurethane foam prepared by applying a compressive force to a partially cured cellular material at a critical time to reduce its volume by a specified amount are reduced by maintaining the compressive force for between about 0.1 and about 10 minutes. If desired, the compressive means can be heated to a temperature between about 40° and about 200° C. The resulting foams are particularly useful for such applications as rug padding.

---

This application is a continuation-in-part of Ser. No. 715,116, filed Feb. 27, 1968, and Ser. No. 658,314, filed Aug. 4, 1967, both of which are now abandoned.

This invention relates to a process for controlling the amount of densification in selected polyurethane foams and to products produced thereby.

The preparation of polyurethane elastomers has been known for many years. U.S. Pat. No. 2,866,774 discloses a technique for preparing polyurethane rubbers by reacting a polyether glycol of at least 600 molecular weight with an organic polyisocyanate. Although this type of polyurethane elastomer is somewhat flexible, the density is generally greater than about 40 pounds per cubic foot and control of density is not easily obtained during processing. In addition, elastomers of this type generally must be prepared by batch-wise casting or molding rather than on a continuous basis.

Polyurethane foams meet the flexibility and cost requirements, but they do not meet the density, resiliency and durability requirements which make them suitable for such uses as backing for floor covering materials and the like. Attempts have been made to increase the density of flexible polyurethane foams, but the techniques employed and the results obtained have been unattractive for various reasons.

Thus, U.S. Pat. 3,298,976 discloses that flexible polyurethane foams having densities from about 3.0 to 4.2 pounds per cubic foot can be prepared by the incorporation of particles of barytes in the polyurethane forming reaction mixture. However, in addition to requiring an added ingredient, such polyurethane foams are unsuitable in applications where denser, flexible polyurethane foams are desired.

It is also known that crushing polyurethane foams without a long curing period causes permanent densification of the center portion of the foam, rendering the entire piece unusable. This undesirable effect is reported in Mobay Chemical Company Technical Information Bulletin No. 38–F14, dated Nov. 25, 1959.

It has recently been found that selected, flexible, densified polyurethane foams can be prepared by employing a combination of critical interrelated process steps. This economical, commercially attractive process is fully described in copending patent application of Natale C. Zocco and Stanley I. Cohen, entitled Polyurethane Foams Having Increased Density and Process Therefor, Ser. No. 780,247, filed Nov. 29, 1968, now U.S. Pat. No. 3,506,600, issued Apr. 14, 1970, and the entire disclosure of this application is herewith incorporated by reference in its entirety.

Briefly, the aforementioned U.S. patent application, Ser. No. 780,247, describes a process for preparing densified polyurethane foams having a density between about 1.5 and about 15 pounds per cubic foot, and preferably between about 1.5 and about 10 pounds per cubic foot, which comprises allowing a polyurethane foam-forming reaction mixture having a free rise density between about 0.8 and about 4.0 pounds per cubic foot to rise, thereby forming a partially cured cellular material; maintaining the partially cured cellular material for a critical period of time at a critical environmental temperature and applying a compressive force to the partially cured cellular material to reduce its volume by a specified amount. By the term "free rise density" in the claims and specification herein is meant the density a polyurethane foam would have if the foam-forming reaction mixture were allowed to rise and cure without the application of a compressive force.

The resulting densified polyurethane foams are characterized by superior physical properties, and are suitable for a variety of applications, as is more fully described in co-pending application Ser. No. 780,247. However, in some embodiments, the densified polyurethane foams may have top and/or bottom layers of less dense flexible polyurethane foam. While such products are desirable for use in cushioning applications, other utilities require only the densified portion of the polyurethane foam. Thus, the densified polyurethane foam is trimmed to remove the undesirable exterior layers or a fluorine-containing foaming agent is employed in the formulation in order to minimize the presence of such layers.

It has now been found in accordance with the process of this invention that the amount of exterior less dense flexible polyurethane foams in the previously described product can be minimized or eliminated by increasing the duration of the crushing period. It has also been found that heated crushing means can be suitably employed to minimize the period of crush duration required to eliminate these exterior layers from the product.

More in detail, the process to which the present invention pertains, as disclosed in co-pending application Ser. No. 780,247, comprises applying a compressive force to a partially cured polyurethane foam at any time after completion of the rise of the foam, as indicated by the appearance of bubbles on the surface of the foam, up to about 10 minutes thereafter.

During the period of time which elapses between the completion of the rise of the uncured foam and the application of pressure, referred to hereinafter as the "crush time," the partially cured cellular material is maintained within a critical environmental temperature range. Thus, where the crush time is between 0 and about 2.5 minutes, temperatures between about 45° and about 400° F. and preferably between about 45° and about 200° F. are employed. Narrower temperature ranges are utilized where the partially cured cellular material is maintained for a longer crush period. Thus, where the time interval is between about 2.5 and about 5 minutes, temperatures between about 45° and about 200° F. and preferably between about 45° and 100° F. are maintained, while temperatures between about 45° and 110° F. and preferably between about 45° and about 85° F. are employed wherein about 5 to about 10 minutes elapse before the application of a compressive force to the partially cured cellular material.

Conventional means, such as ovens and cooling systems, are employed, if necessary, to provide the desired temperatures.

In commercial operations, it is particularly preferred to operate under environmental conditions, and thus temperatures from about 70° to about 110° F. are employed therein while maintaining any crush time within the broad range of 0 to 10 minutes.

In accordance with the process of this invention, a compressive force is then applied for a period of time between about 0.1 and about 10 minutes. This period of time, referred to in the specification and claims herein as the "crush duration," is the period of time at which the partially cured cellular material is maintained at its desired maximum point of deflection. Thus, where crushing rollers are employed as the compressive means, the period of time of the crush is measured by the length of time the foam is crushed to the minimum preset height.

Any suitable compressive means, such as rollers, platens, etc., can be suitably employed to compress the partially cured cellular material.

It has also been found in accordance with this invention that heating the compressive means to a temperature between about 40° and about 200° C. minimizes the previously described crush duration required to eliminate the less dense exterior layers in the densified polyurethane foam product. Illustrative heated platens are described in U.S. Pat. No. 2,096,338 and the disclosure of this patent is herewith incorporated by reference in its entirety. It is also within the scope of this invention to employ a single heated crushing means, e.g., the top or bottom platen, where a product having a single less dense exterior layer is desired.

After the partially cured polyurethane foam has been subjected to the pressure of the compressive means for the desired length of time, the compressive force is removed and curing of the compressed material is completed. While curing can be accelerated by the application of heat, such treatment is not generally necessary since the foam will completely cure under ambient conditions. Thus, it will be recognized that completion of the cure can be effected with or without the use of elevated temperatures, and that both means are encompassed by the procedural step referred to in the description and in the claims herein as "removing the compressive force and completing the cure of the compressed cellular material."

After removal of the compressive force and completion of the cure, the densified foam may recover a small portion, the difference between its initial height and the crushing gap, the degree of recovery depending upon the particular process variables. Of course, since the foam has been densified, it is apparent that it never completely regains its original dimensions.

In the preparation of the densified urethane compositions of this invention either the so-called "one-shot method" or the "semi-prepolymer technique" ("quasi-prepolymer" technique) may be employed. Any combination of polyols, including polyether polyols and polyester polyols, organic polyisocyanate, foaming agent, catalyst and other reactants capable of forming a flexible urethane foam can be employed in carrying out the process of this invention, and the term "polyurethane foam-forming reaction mixture" in the specification and claims herein is meant to include any such combination, with the proviso that the polyurethane foam-forming reaction mixture has a free rise density between about 0.8 and about 4.0 pounds per cubic foot. Typical formulations are described in U.S. Pat. No. 3,072,582 and Canadian Pat. No. 705,938.

While, as indicated above, both polyether and polyester polyols can be employed in the practice of this invention, preferred embodiments utilize the polyether polyols in the preparation of the polyurethane foam-forming reaction mixture. To further illustrate suitable formulations, the polyether polyols useful for the preparation of the polyurethane material of this invention include oxyalkylated polyhydric alcohols having a molecular weight in the range between about 700 and about 10,000 and preferably between about 1,000 and 6,000. The hydroxyl number of the polyether polyol is generally less than about 250 and preferably in the range between about 25 and about 175. These oxyalkylated polyhydric alcohols are generally prepared by reacting in the presence of an alkaline catalyst, a polyhydric alcohol and an alkylene oxide such as ethylene oxide, propylene oxide, butylene oxide, amylene oxide, epichlorohydrin, and mixtures of these alkylene oxides, by either random addition or step-wise addition.

Polyhydric alcohols suitable for use in preparing the polyether polyol include ethylene glycol, pentaerythritol, methyl glucoside, propylene glycol, 2,3-butylene glycol, 1,3-butylene glycol, 1,5-pentane diol, 1,6-hexane diol, glycerol, trimethylolpropane, sorbitol, sucrose, mixtures thereof and the like. If desired, a portion or all of the polyhydric alcohol may be replaced with another compound having at least two reactive hydrogen atoms, such as alkyl amines, alkylene polyamines, cyclic amines, amides, and polycarboxylic acids. Suitable alkyl amines and alkylene polyamines include methylamine, ethylamine, propylamine, butylamine, hexylamine, ethylenediamine, 1,6-hexanediamine, diethylenetriamine, and the like. Also, such cyclic amines as piperazine, 2-methylpiperazine and 2,5-dimethylpiperazine can also be used. Amides, such as acetamide, succinamide and benzenesulfonamide, constitute a further class of such reactive hydrogen compounds. A still further class of such reactive hydrogen compounds is the di- and polycarboxylic acids, such as adipic acid, succinic acid, glutaric acid, aconotic acid, diglycollic acid, and the like. It will be recognized that the reactive hydrogen compound can be one containing different functional groups having reactive hydrogen atoms, such as citric acid, glycollic acid, ethanolamine, and the like. Aromatic polyamines such as toluene diamine can also be employed. Mixtures of oxyalkylated polyhydric alcohols are also suitable for use in the process of this invention.

The organic polyisocyanates used in the preparation of the densified urethane composition of this invention include toluene diisocyanate, such as the 4:1 mixture or the 65:35 mixture of the 2,4- and 2,6-isomers, ethylene diisocyanate, propylene diisocyanate, methylene-bis-4-phenyl isocyanate, 3,3'-bitoluene-4,4'-diisocyanate, hexamethylene diisocyanate, naphthalene-1,5-diisocyanate, polyphenylene polymethylene isocyanate, mixtures thereof and the like. The amount of isocyanate employed in the process of this invention should be sufficient to provide at least about 0.7 NCO group per hydroxyl group present in the reaction system, which includes the polyol as well as any additive or foaming agent employed. An excess of isocyanate compound may be conveniently employed; however, this is generally undesirable due to the high cost of the isocyanate compounds. It is preferable, therefore, to employ sufficient isocyanate to provide no greater than about 1.25 NCO groups per hydroxyl group, and preferably between about 0.9 and about 1.5 NCO groups per hydroxyl group. The ratio of NCO to OH groups times 100 is referred to as the "index."

The partially cured polyurethane foams are prepared in the presence of a foaming agent, reaction catalysts, and preferably a small proportion of a conventional surfactant. The foaming agent employed may be any of those known to be useful for this purpose, such as water, as well as organic foaming agents containing up to about seven carbon atoms such as the halogenated hydrocarbons, lower molecular weight alkanes, alkenes, ethers and mixtures thereof. Typical halogenated hydrocarbons include, but are not limited to: monofluorotrichloromethane, dichlorofluoromethane, difluorodichloromethane, 1,1,2-trichloro-1,2,2-trifluoroethane, dichlorotetrafluoroethane, ethyl chloride, methylene chloride, chloroform, and carbon tetrachloride. Other useful foaming agents include lower molecular weight alkanes, alkenes and ethers such as methane, ethane, ethylene, propane, propylene, pentane, hexane, heptane, ethyl ether, diisopropyl ether, mixtures thereof, and the like. The amount of foaming agent employed may be varied within a wide range. Generally, however, the halogenated hydrocarbons are employed in an amount from about 1 to 50 parts by weight per 100 parts by weight of the polyol, and generally water is employed in an amount from about 1.0 to 6.0 parts by weight per 100 parts by weight of the polyol.

The partially cured polyurethane foams are prepared in the presence of a catalytic amount of a reaction catalyst. The catalyst employed may be any of the catalysts known to be useful for this purpose, or mixtures thereof, including tertiary amines and metallic salts, particularly stannous salts. Typical tertiary amines include, but are not limited to, the following: N-methyl morpholine, N-hydroxyethyl morpholine, triethylene diamine, triethylamine and trimethylamine. Typical metallic salts include, for example, the salts of antimony, tin and iron, e.g., dibutyltin dilaurate, stannous octoate, and the like. Any catalytic proportion of catalysts may be employed. Preferably, a mixture of amine and metallic salt is employed as the catalyst. The catalyst or catalyst mixture, as the case may be, is usually employed in an amount ranging between about 0.05 and about 1.5, and preferably between about 0.075 and about 0.50 percent by weight of the polyol.

It is preferred in the preparation of the polyurethane compounds of the present invention to employ minor amounts of a conventional surfactant in order to further improve the cell structure of the polyurethane foam. Typical of such surfactants are the silicone oils and soaps, and the siloxane-oxyalkylene block copolymers. U.S. Pat. 2,834,748 and T. H. Ferrigno, Rigid Plastic Foams (New York: Reinhold Publishing Corp., 1963), pp. 38–42 disclose various surfactants which are useful for this purpose. Generally up to 2 parts by weight of the surfactant are employed per 100 parts of the polyol.

Various additives can be employed which serve to provide different properties, e.g., fillers such as clay, calcium sulfate, or ammonium phosphate may be added to lower cost and improve physical properties. Ingredients such as dyes may be added for color, and fibrous glass, asbestos, or synthetic fibers may be added for strength. In addition, plasticizers, deodorants and anti-oxidants may be added.

If desired, the flexible, densified polyurethane foam of this invention can be prepared batch-wise. An illustrative batch process comprises feeding the foam-forming ingredients into a conventional box, allowing the foam to complete the rise, permitting the curing time to expire while maintaining an environmental temperature within the previously described critical range, removing the box from the partially cured cellular material, and then applying compressive means thereto. Pressure is applied to the foam for the desired time by means of platens or rollers to compress it to between about ⅔ and about ⅒ of its original volume and then removed to permit the compressed foam to complete the cure.

However, it is preferred, particularly in commercial operations, to employ a continuous process for the preparation of the flexible, densified polyurethane foams of this invention. An exemplificative continuous process comprises admixing the foam-forming ingredients in a suitable mixing head and feeding the resulting mixture to a moving conveyor having suitable side retaining means to contain the liquid reactants. The side-retaining means are necessary until the foam gels sufficiently to support its own weight. As the reaction proceeds while moving along the conveyor, bubbles form in the reaction mixture, which effects a volume increase and the formation of an uncured porous gel. After the uncured porous gel has traveled along the conveyor for a predetermined crush time and at an appropriate environmental temperature, the resulting partially cured cellular material is passed between a suitable compressive device, e.g., a pair of belts supported by rotating crushing rollers, the length of the belts being adjusted to effect the desired crush duration. Suitable means for slitting the densified polyurethane foam may be installed at a further point along the conveyor.

As previously indicated, the densified polyurethane foams of this invention are particularly suitable in selected applications. For example, they can be used as innersoles and liners for shoes; as backing, either as an integral part or a separate layer, for floor tiles made of rubber, asphalt, vinyl asbestos, vinyl, linoleum, chlorinated polyethylene elastomer, and others; carpet backing and padding, either as an integral part or a separate layer, for carpets or rugs including wool, nylon, cotton, rayon, acrilan, polypropylene, and others types; gasketing of all types; padding applications of all types including floor pads for use in occupations requiring prolonged standing, table pads or table pad construction, key pads for musical (reed) instruments, packaging uses for delicate instruments; belting uses, particularly where chemical resistance is important; trim seals and gaskets for automotive, refrigeration and other applications; special filter media; weather-stripping; vibration insulators, including motor mounts; gymnastic equipment; hammers for piano construction; solid tires for fork-lifts, etc.; roofing systems, including use in laminates such as with chlorinated polyethylene; underlay for flooring materials including tiles and sheeting; backing for floor sheeting materials as an integral part of the sheet; padding and case liners for delicate instruments; industrial roll covering; elastomeric hammer heads; bottle cap liners; bulletin board construction; sealant gaskets, such as for drums, pails and other containers; wear-resistant stair treads and heavy-traffic-area floor covering; bumpers for loading docks and similar uses; blackboard erasers; squeegees for various applications; windshield wipers; door mats; skid-resistant, mar-resistant sheeting for underlining lamps, desk accessories, vases, appliances, etc.; pressure-sensitive tapes; phonograph turntable cushioning; automotive pedal covers; recoil pads for firearms; and automotive padding.

The following examples are presented to illustrate the invention more fully without any intention of being limited thereby. All parts and percentages are by weight unless otherwise specified.

EXAMPLES 1–6

A foam formulation having a free rise density of about 1.5 pounds per cubic foot was prepared from the following ingredients in the following proportions:

| Ingredients: | Proportions |
| --- | --- |
| Oxypropylated glycerol (molecular weight 3000) | 100 |
| Water | 4 |
| Silicone surfactant (Dow Corning DC–190) [1] | 1.5 |
| Triethylene diamine | 0.10 |
| Stannous octotate | 0.25 |
| Toluene diisocyanate (80% 2,4- 20% 2,6-isomer; 105 index) | 49.8 |

[1] This surfactant is a block copolymer of a polydimethylsiloxane and a polyether resin.

Using the above formulation, six foams, identified as Examples 1–6, respectively, were formed by pouring each foam into a square cardboard box having sides of 8 inches and a height of 4 inches, allowing a 90-second crush time at 75° F. after completion of the rise. The box was removed and the foam, which had risen to a height of 4 inches, was crushed under ambient conditions in a hand press fitted with a one-inch spacer. The duration of the crush was varied for each foam, as indicated in the table below. After the crush period was over, each foam was allowed to cure completely and the thickness of the densified layer and the light-weight external layers were determined. Then density of each densified layer was between about 4.0 and about 5.5 pounds per cubic foot.

| Example | Crush duration (sec.) | Thickness (inches) after crush | | | | |
|---|---|---|---|---|---|---|
| | | Total height | Dense core | Top layer | Bottom layer | Total undensified |
| 1 | 5 | 2 | 1 | 1/2 | 1/2 | 1 |
| 2 | 30 | 1 5/8 | 1 | 5/16 | 5/16 | 5/16 |
| 3 | 60 | 1 3/8 | 1 | 1/4 | 1/8 | 3/8 |
| 4 | 120 | 1 1/4 | 1 1/8 | 1/8 | 0 | 1/8 |
| 5 | 300 | 1 3/16 | 1 1/16 | 3/16 | 0 | 3/16 |
| 6 | 600 | 1 3/16 | 1 3/16 | 0 | 0 | 0 |

As shown in Examples 1-6, increasing the time of the crush duration markedly reduces the thickness of the external light-weight layers. As shown in Examples 4, 5 and 6, when the crush was applied for at least two minutes, there was no measurable light-weight exterior on the bottom of the foam, and if the crush was applied for ten minutes, there was no light-weight layer either on the bottom or the top of the foam.

EXAMPLES 7-19

Employing the foam formulation of Examples 1-6, twelve foams, identified as Examples 7-19 respectively, were formed by pouring each foam into a square cardboard box having sides of 8 inches and a height of 4 inches, allowing a 90 second crush time at 75° F. to elapse after the appearance of bubbles on the surface of the foam indicated completion of the rise. The box was then removed and the foam, which had risen to a height of 4 inches, was crushed in an Elmes press provided with heating means in each platen. A one-inch spacer was placed between the platens so that each foam was crushed to a thickness of one inch for the period of time indicated below in the table. The platens were heated in each example to the temperature indicated below in the table. In Example 19, only the bottom platen was heated to demonstrate the effect of a single heated crushing element on the structure of the product.

After the crush period was completed, each foam was allowed to cure competely, and the thickness of the densified layer and the light-weight external layers were determined. Each densified layer had a density between about 4.0 and about 5.5 pounds per cubic foot.

| Ex. | Temp., °C. | Duration of crush, sec. | Thickness after crush (inches) | | | | |
|---|---|---|---|---|---|---|---|
| | | | Total | Dense core | Undensified layers | | Total undensified |
| | | | | | Top | Bottom | |
| 7 | 50 | 5 | 1.56 | 1.06 | .26 | .24 | .50 |
| 8 | 50 | 20 | 1.30 | 1.10 | .20 | 0 | .20 |
| 9 | 50 | 90 | 1.10 | 1.10 | 0 | 0 | 0 |
| 10 | 75 | 5 | 1.56 | 1.02 | .24 | .30 | .54 |
| 11 | 75 | 20 | 1.22 | 1.18 | .04 | 0 | .04 |
| 12 | 75 | 45 | 1.24 | 1.16 | 0 | 0 | 0 |
| 13 | 100 | 5 | 1.84 | .90 | .30 | .64 | .94 |
| 14 | 100 | 20 | 1.18 | 1.18 | 0 | 0 | 0 |
| 15 | 150 | 5 | 1.36 | 1.10 | .26 | 0 | .26 |
| 16 | 150 | 20 | 1.45 | 1.45 | 0 | 0 | 0 |
| 17 | 175 | 5 | 1.36 | .94 | .28 | .14 | .42 |
| 18 | 175 | 10 | 1.22 | 1.22 | 0 | 0 | 0 |
| 19 | [1] 100/25 | 20 | 1.34 | 1.02 | .32 | 0 | .32 |

[1] Bottom/top.

As indicated in the table, heating the crushing means minimizes the crush duration required for complete densification of the partially cured polyurethane foam.

What is claimed is:

1. In the process for preparing a flexible, densified polyurethane foam having a density between about 1.5 and about 15 pounds per cubic foot by
   (a) placing a polyurethane foam-forming reaction mixture having a free rise density between about 0.8 and about 4.0 pounds per cubic foot in a reaction zone and allowing the mixture to rise, thereby forming a partially cured cellular material;
   (b) applying a compresive force to the partially cured cellular material at a period of time between 0 and about 10 minutes after completion of the rise, thereby reducing the volume of the partially cured cellular material to between about 2/3 and about 1/10 of its original volume; and
   (c) removing the compressive force and completing the cure of the compressed cellular material
with the proviso that
   where the period of time between completion of the rise and application of the compressive force is between 0 and about 2.5 minutes, the partially cured cellular material is maintained at an environmental temperature between about 45° and about 400° F. for said period;
   where said period of time is between about 2.5 and about 5 minutes, the partially cured cellular material is maintained at an environmental temperature between about 45° and about 200° F. for said period; and
   where said period of time is between about 5 and about 10 minutes, the partially cured cellular material is maintained at an environmental temperature between about 45° and 100° F. for said period; thereby providing a flexible, densified polyurethane foam having one or more exterior layers of light-weight polyurethane foam;
the step which comprises applying said compressive force to the partially cured cellular material for a period, between about 0.1 and about 10 minutes, sufficient to reduce the thickness of said exterior layer of foam, the temperature of the compressive means during said period being maintained between about 40 and about 200° C.

2. The process of claim 1 wherein the polyol employed in the preparation of said polyurethane foam-forming reaction mixture is a polyether polyol.

3. The process of claim 2 wherein said polyether polyol is an oxyalkylated polyhydric alcohol having a molecular weight in the range between about 700 and about 10,000.

4. The process of claim 3 wherein said polyether polyol is oxypropylated glycerin.

5. The process of claim 4 wherein the reaction catalyst employed in the preparation of said polyurethane foam-forming reaction mixture is a mixture of an amine and a stannous salt.

6. The process of claim 1 wherein said polyurethane foam-forming reaction mixture comprises oxypropylated glycerin having a molecular weight in the range between about 1,000 and about 6,000, toluene diisocyanate, water and a mixture of an amine and a stannous salt.

7. In the process for preparing a flexible, densified polyurethane foam having a density between about 1.5 and about 15 pounds per cubic foot by
   (a) continuously feeding a polyurethane foam-forming reaction mixture having a free rise density between about 0.8 and about 4.0 pounds per cubic foot to a moving reaction zone and allowing the mixture to rise, thereby forming a partially cured cellular material;
   (b) conveying said partially cured cellular material through compressive means at a period of time between 0 and about 10 minutes after completion of the rise, thereby reducing the volume of the partially cured cellular material to between about 2/3 and about 1/10 of its original volume; and
   (c) removing said cellular material from said compressive means and completing the cure of the compressed cellular material
with the proviso that
   where the period of time between completion of the rise and application of the compressive force is between 0 and about 2.5 minutes, the partially cured cellular material is maintained at an environmental temperature between about 45° and about 400° F. for said period;
   where said period of time is between about 2.5 and about 5 minutes, the partially cured cellular material is maintained at an environmental temperature between about 45° and about 200° F. for a said period; and where said period of time is between about 5 and about 10 minutes, the partially cured cellular material is maintained at an environmental temperature between about 45° and 100° F. for said period; thereby providing a densified polyurethane foam having one or more exterior layers of light-weight polyurethane foams;

the step which comprises applying said compressive force to the partially cured cellular material for a period, between about 0.1 and about 10 minutes, sufficient to reduce the thickness of said exterior layer of foam, the temperature of the compressive means during said period being maintained between about 40 and about 300° C.

8. The process of claim 7 wherein said polyurethane foam-forming reaction mixture comprises oxypropylated glycerin having a molecular weight ranging from about 1,000 to about 6,000, toluene diisocyanate, water and a mixture of an amine and a stannous salt.

References Cited
UNITED STATES PATENTS

| | | | |
|---|---|---|---|
| 3,006,033 | 10/1961 | Knox | 18—48 |
| 3,154,606 | 10/1964 | Morecroft et al. | 264—54 |
| 3,246,059 | 4/1966 | Moroni et al. | 264—48 |
| 3,291,873 | 12/1966 | Eakin | 264—54 |
| 3,400,196 | 9/1968 | LeRoy | 264—288 |
| 3,425,890 | 2/1969 | Powers | 264—291 |
| 3,506,600 | 4/1970 | Zocco et al. | 260—2.5 |

DONALD E. CZAJA, Primary Examiner

C. W. IVY, Assistant Examiner

U.S. Cl. X.R.

161—159, 190; 260—2.5; 264—53, 321